(12) United States Patent
Olson et al.

(10) Patent No.: US 7,080,807 B2
(45) Date of Patent: Jul. 25, 2006

(54) WINDOW FRAME/SEAL ASSEMBLY AND METHOD OF FORMING THE SAME

(75) Inventors: Jan B. Olson, Playa Del Rey, CA (US); Mike H. Robson, Sylmar, CA (US)

(73) Assignee: Sierracin Corporation, Sylmar, CA (US)

( * ) Notice: Subject to any disclaimer, the term of this patent is extended or adjusted under 35 U.S.C. 154(b) by 86 days.

(21) Appl. No.: 10/788,198

(22) Filed: Feb. 26, 2004

(65) Prior Publication Data

US 2004/0168380 A1     Sep. 2, 2004

Related U.S. Application Data

(60) Provisional application No. 60/450,394, filed on Feb. 27, 2003.

(51) Int. Cl.
*B64C 1/14*     (2006.01)

(52) U.S. Cl. .................. 244/129.3; 52/208; 52/786.12

(58) Field of Classification Search ................ 244/121, 244/129.3; 52/204.593, 204.591, 305, 786.12, 52/786.11, 200, 309.3, 208, 209; 296/201, 296/84.1
See application file for complete search history.

(56) References Cited

U.S. PATENT DOCUMENTS

| | | | | |
|---|---|---|---|---|
| 2,258,724 | A | * | 10/1941 | Wagner et al. ................. 52/200 |
| 2,409,808 | A | * | 10/1946 | Sowle ......................... 52/309.3 |
| 2,511,168 | A | * | 6/1950 | Martin et al. .................. 428/38 |
| 2,576,392 | A | * | 11/1951 | Downes ........................ 52/208 |
| 2,808,355 | A | * | 10/1957 | Christie et al. ................ 52/208 |
| 3,553,917 | A | | 1/1971 | Gilman |
| 4,004,388 | A | * | 1/1977 | Stefanik ................. 52/204.593 |
| 4,611,850 | A | * | 9/1986 | Fujikawa ..................... 296/201 |
| 4,699,335 | A | * | 10/1987 | DeOms et al. ............ 244/129.3 |
| 5,277,384 | A | * | 1/1994 | Webb ....................... 244/129.3 |
| 6,210,763 | B1 | | 4/2001 | Katoh et al. |
| 6,430,894 | B1 | | 8/2002 | Chae et al. |
| 6,477,812 | B1 | | 11/2002 | Boone et al. |

* cited by examiner

*Primary Examiner*—Galen Barefoot
(74) *Attorney, Agent, or Firm*—Christie, Parker & Hale, LLP

(57) ABSTRACT

A window assembly incorporating a window frame and seal and a method of forming the same are provided. The window assembly includes a window transparency first ply coupled to a first window structure. A window transparency second ply is coupled to the first ply and is spaced apart from the first structure defining a gap there between. A portion of the first structure, or a second window structure coupled to the first structure, extends over the second ply. A seal is placed, fitted or formed within the gap and between the second ply and the portion of the first structure or the second structure extending over the second ply.

30 Claims, 4 Drawing Sheets

WINDOW FRAME/SEAL ASSEMBLY AND METHOD OF FORMING THE SAME

CROSS REFERENCE TO RELATED APPLICATION

This application is based upon and claims priority on U.S. Provisional Application No. 60/450,394, filed on Feb. 27, 2003, the contents of which are fully incorporated herein by reference.

BACKGROUND OF THE INVENTION

This invention is directed to a frame and a seal and more specifically to a window assembly incorporating a window frame and seal and to a method for forming such frame and seal and assembly.

A window, such as an aircraft type of window, as for example shown in FIG. 1a, is mounted on a frame 8 which may be an integral of the windshield or separate part of the structure of the vehicle, such as an aircraft. As shown in FIGS. 1A and 1B, an exemplary aircraft window 10 is a laminate structure and includes a main ply 12 which is typically made out of a polycarbonate, acrylic or glass. An interlayer 14 typically made of polyurethane or polyvinyl is bonded on an outer face of the main ply. A face ply 16 is bonded on top of the interlayer. The face ply is typically made of glass. A heater layer or coating 15 may be applied to the inner surface of the face ply allowing for the heating of the face ply for purposes of defrosting, and the prevention of ice build-up on the face ply.

The face ply does not extend to the ends of the main ply. As such, an end portion 18 of the main ply is not covered by the face ply and interlayer. This end portion is mated to the frame 8. Typically, the end portion of the main ply is fastened to the window frame using fasteners 20, or may simply clamp an end portion of a windshield.

The face ply is typically coated with Tin Oxide. The Tin Oxide coating is typically grounded to the frame 8 using a wire braid 21.

When the main ply is mounted to the frame, a gap 22 is left between an end of the frame and the ends of the face ply and interlayer. This gap allows for expansion and contraction of the window, i.e., the main play, the face ply and interlayer. The gap is sealed with a sealant, typically a polysulfide sealant, which fills in the gap and extends over the face ply forming a hump seal 24 for preventing moisture from entering through the gap. Such moisture can cause delamination the window 10. Typically, the hump seal extends a distance 26 about half an inch over the face ply.

By extending over the outer surface of the face ply, the hump seal is exposed to the outer environment, and is consequently susceptible to erosion, cracking and lifting which results in the intrusion of moisture into the laminate structure of the window 10. As a result, the hump seal has to be frequently inspected and repaired to prevent window delamination and/or heater layer failure.

Another problem with a hump seal is that it is costly to manufacture in that it requires a specific amount of sealant of a specific thickness to extend a specific amount over the face ply. As a result, the process of forming and controlling a hump seal is very labor intensive. The hump seal can also fail due to the delamination of the edge of the face ply abutting the hump seal and/or the delamination of the hump seal from the face ply.

A further problem with conventional aircraft window assemblies is that with time the face ply separates, i.e., delaminates, from at its edge from the interlayer 14, and/or the interlayer 14 and face ply delaminate from the main ply. This delamination also results in failure of the seal and is a frequent cause of aircraft window failures.

As such, a frame and seal system incorporated in a window assembly is desired that is more resistant to erosion, cracking and lifting and provides more resistance to face ply edge delamination and which is easier to manufacture.

SUMMARY OF THE INVENTION

A window assembly incorporating a window a frame and a seal and a method of forming the same are provided. In a first exemplary embodiment, a window assembly is provided. The assembly includes a window frame, a window transparency first ply coupled to the frame and extending beyond the frame, and a window transparency second ply coupled to the first ply. The second ply extends beyond the frame and is spaced apart from the frame defining a gap between the frame and the second ply. A portion of the frame extends over the second ply. A seal is placed, fitted or formed within the gap and between the second ply and the portion of the frame extending over the second ply. In another exemplary embodiment, a spacer is sandwiched between the frame and the first ply. In yet another exemplary embodiment, the frame portion extending over the second ply also extends over the gap and the thickness of the frame portion extending over the second ply and gap is less than the thickness of the frame not extending over the second ply and gap. In another exemplary embodiment, the portion of the frame extending over the second ply has a sufficient stiffness for preventing a portion of the second ply, over which extends the portion of the frame, from delaminating from the first ply. In another exemplary embodiment, the portion of the frame extending over the second ply provides a clamping force on the second ply.

In a further exemplary embodiment, a window assembly is provided having a window frame, a spacer coupled to the frame, a window transparency first ply coupled to the frame and extending beyond the frame, such that the spacer is sandwiched between the frame and first ply, and a window transparency second ply coupled to the first ply and extending beyond the spacer and being spaced apart from the spacer defining a gap between the spacer and the second ply, such that a portion of the frame extends over the second ply. A seal is placed, fitted or formed within the gap and between the second ply and the portion of the frame extending over the second ply. In yet another exemplary embodiment, the frame portion extending over the second ply also extends over the gap and the thickness of the frame portion extending over the second ply and gap is less than the thickness of the frame not extending over the second ply and gap.

In another exemplary embodiment a window assembly is provided having a window frame, a window transparency first ply coupled to the frame and extending beyond the frame, and a window transparency second ply coupled to the first ply and extending beyond the frame. The second ply is spaced apart from the frame defining a gap between the frame and the second ply. A supporting member is coupled to the frame and has a portion extending over the second ply, such that a portion of the frame is sandwiched between the supporting member and the first ply. A seal is placed, fitted or formed within the gap and between the second ply and the portion of the supporting member extending over the second ply. In yet another exemplary embodiment, the portion of the supporting member extending over the second ply extends over the gap and has a thickness that is less than a thickness of a portion of the supporting member not extending over the second ply and the gap.

In yet a further exemplary embodiment, a window assembly is provided having a window first structure, a window transparency first ply coupled to the first structure, a window transparency second ply coupled to the first ply and spaced apart from the first structure wherein a gap is defined between the second ply and the first structure. The assembly also includes a window second structure coupled to the first structure, such that a portion of the second structure extends beyond the first structure and over the second ply. A seal is located, fitted or formed within the gap and between the second ply and the portion of the second structure extending over the second ply. In another exemplary embodiment, the portion of the second structure extending over the second ply has a sufficient stiffness for preventing a portion of the second ply, over which extends the portion of the second structure, from delaminating from the first ply. In another exemplary embodiment, the portion of the second structure extending over the second ply provides a clamping force on the second ply.

In another exemplary embodiment a method of forming a window assembly is provided. The method includes providing a window frame, coupling a window transparency first ply to the frame such that a portion of the first ply extends beyond the frame, and coupling a window transparency second ply to the first ply at a location spaced apart from the frame, wherein a gap is defined between the second ply and the frame, and wherein a portion of the frame extends over the second ply. The method further requires providing a seal within the gap and between the second ply and the portion of the frame extending over the second ply.

In another exemplary embodiment the method further includes compressing the seal between the frame, the first ply and the second ply, and removing a portion of the seal extending beyond the frame. In a further exemplary embodiment, the providing a seal includes applying a sealing material to the gap and between the frame and the second ply and removing a portion of the sealing material extending beyond the frame. The sealing material may be selected from group of sealing materials consisting of silicones, polyurethanes, polysulfides, or other elastomeric materials.

In a further exemplary embodiment, the method includes selecting the thickness of the frame portion extending over the second ply to be sufficient for preventing a portion of the second ply over which extends the portion of the frame from delaminating from the first ply. In another exemplary embodiment the method includes providing a clamping force on the second ply with the portion of the frame extending over the second ply. In an exemplary embodiment, the clamping force provided is in reaction to an outward pressurization deflection of the first ply.

In yet a further exemplary embodiment, a method for forming a window assembly is provided including providing a window first structure, coupling a window transparency first ply to the first structure, coupling a window transparency second ply to the first ply at a location spaced apart from the first structure wherein a gap is defined between the second ply and the first structure, and providing a window second structure, wherein a portion of the second structure ply extends beyond the first structure and over the second ply. The method further includes providing a seal within the gap and between the second ply and the portion of the second structure extending over the second ply. In another exemplary embodiment, the method further requires removing excess seal extending beyond the second structure portion extending over the second ply. In a further exemplary embodiment, the method includes selecting the thickness of the second structure portion extending over the second ply to be sufficient for preventing a portion of the second ply over which extends the portion of the second structure from delaminating from the first ply. In another exemplary embodiment the method includes providing a clamping force on the second ply with the portion of the second structure extending over the second ply. In an exemplary embodiment, the clamping force provided is in reaction to an outward pressurization deflection of the first ply.

DETAILED DESCRIPTION

Figure 1A:
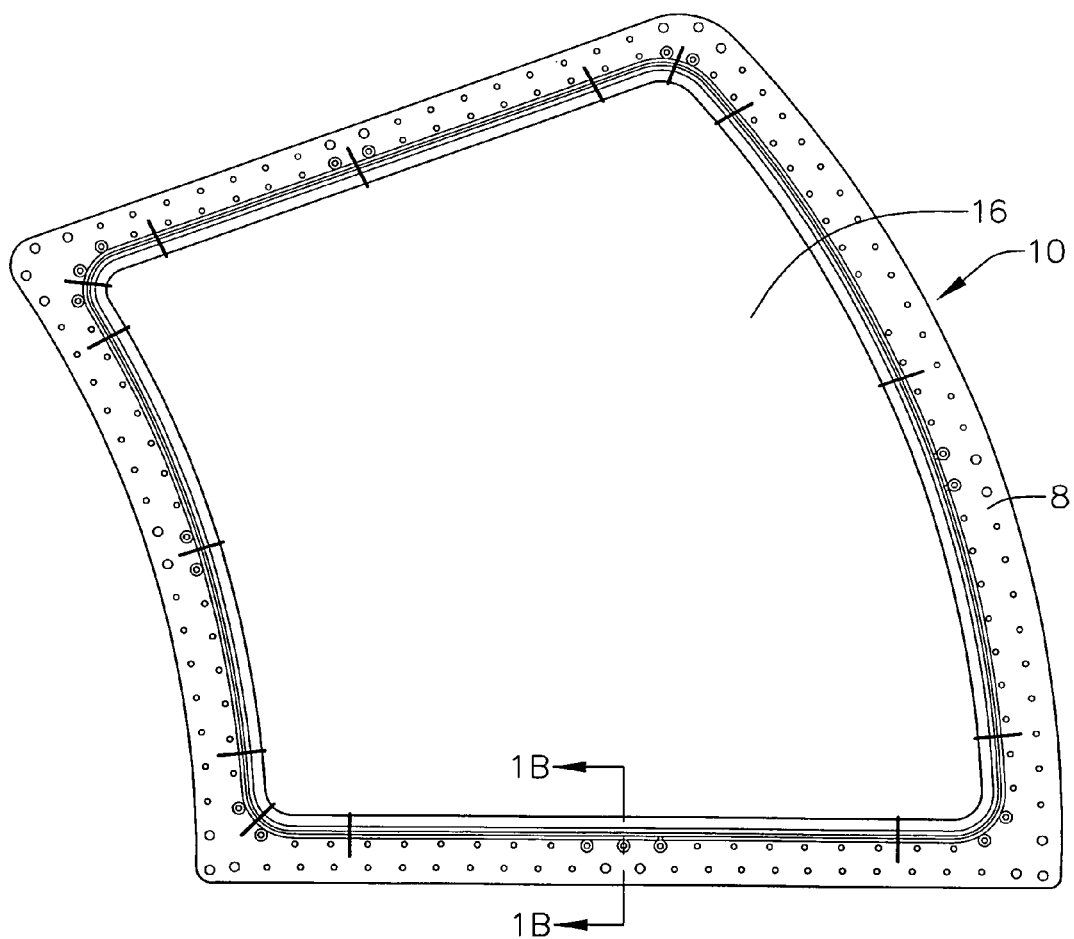
FIG. 1A is a top view of a conventional aircraft window assembly.
Figure 1B:
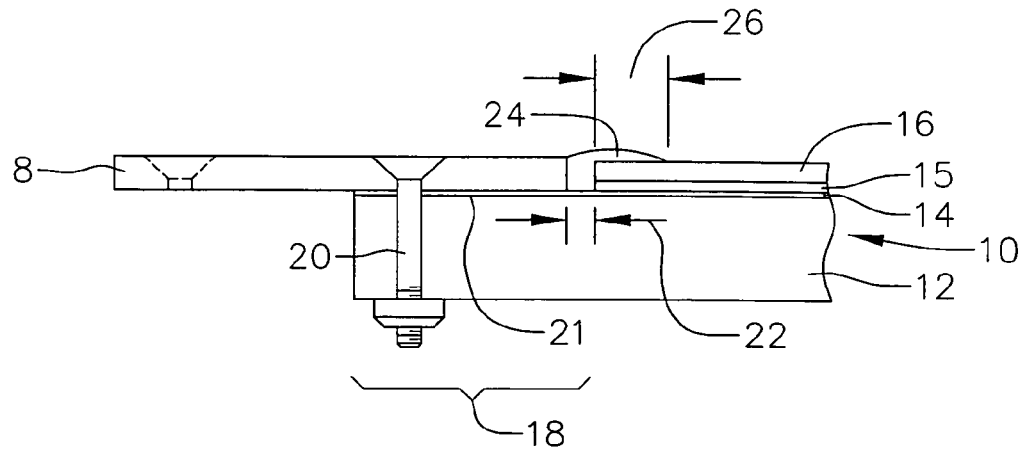
FIG. 1B is a cross-sectional view of a conventional window assembly taken along arrows 1B—1B shown in FIG. 1A.

An exemplary embodiment window assembly of the present invention includes a frame having an overhang portion 30 that overhangs beyond the frame and over the face ply 16 at a distance 32 such that it extends a distance 26 from the edge of the face ply equal to the distance that the seal is required to extend over the face ply. In an exemplary embodiment the distance 26 is about half an inch.

For convenience, the same reference numerals are used to identify the same elements in the exemplary embodiments of the present invention as in the prior art. Moreover, the terms "over" and "under" are used herein as relative terms for descriptive purposes and not for denoting the exact location of the object they refer to.

Figure 2:
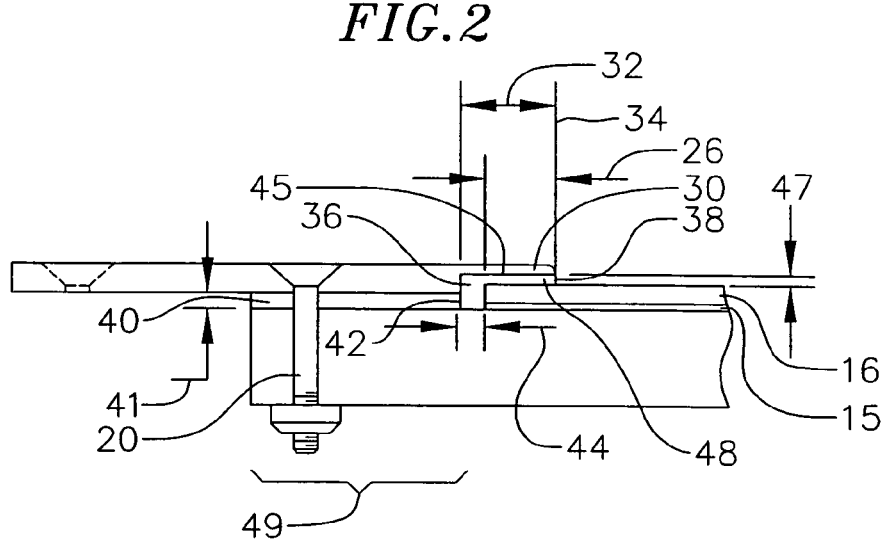
FIG. 2 is a cross-sectional view of an exemplary embodiment window assembly of the present invention.

In an exemplary embodiment shown in FIG. 2, the overhang portion 30 of the frame is formed by removing an end portion of the frame facing the main ply. This may be accomplished by many well known methods including machining. The overhang portion extends beyond a first end 36 of the frame 8. A frame second end 38 is defined at the end overhang portion.

With this exemplary embodiment, a spacer 40 is used over the end portion 49 of the main ply 12 extending beyond the frame first end 36. The spacer in an exemplary embodiment is made of plastic or a nylon laminate and has a thickness 41 between the main ply and the frame of about 0.15 inch. The main ply is mounted on the frame sandwiching the spacer against the frame. In the exemplary embodiment, the frame is fastened to the main ply with fasteners 20 that penetrates the frame, the spacer and the main ply.

When the main ply and spacer are mounted on the frame, the first end 36 of the frame is aligned with an end 42 of the spacer closer to the face ply. A gap 44 is defined between the end 42 of the spacer closer to the face ply and the face ply. In an exemplary embodiment, the gap has a width of about ¼ inch.

With this exemplary embodiment, a seal or a sealing material such as silicone, polyurethane, polysulfide or other elastomeric material or a dry seal of any such material is fitted into the gap and extends over the face ply for forming the seal 45. When the main ply is mounted to the frame, such that the spacer is sandwiched between the main ply and the frame, the seal is fitted within the gap 44 and between the frame overhang portion 30 and the face ply 16. If the seal is in a fluid form or in an elastomeric form, excess seal material may extend beyond the frame overhang portion as the frame overhang portion compresses the seal against the face ply. Since the frame overhang portion extends to the location 38 over the face ply to which the seal is required extend for proper sealing, the excess sealing material or seal extending beyond the overhang may be removed ensuring that the proper length of seal extends over the face ply. In this regard, the length and thickness of the seal extending over the face ply are easily obtained without having to measure or machine. In an exemplary embodiment, the thickness 47 of the seal hump portion 48, i.e., the seal portion extending over the face ply between the face ply and the frame overhang is in the range 0.05 to 0.10 inch.

In a further exemplary embodiment, the spacer 40 may be of sufficient thickness spacing the frame from the main ply such that the frame can extend over the face ply 16 without the end of the frame having to be machined to define an overhang portion. With this embodiment, the seal will be fitted within the gap 44 and between the face ply and the frame portion extending over the face ply.

In another exemplary embodiment, if the face ply is coated with Tin Oxide, the seal 45 may be made from or include a conductive material for grounding the Tin Oxide coating of the frame. In an alternate exemplary embodiment, conductive material such as conductive silicone may be placed in appropriate locations for grounding the Tin Oxide coating. In this regard a wire braid is not required for grounding the Tin Oxide coating.

Figure 3A:
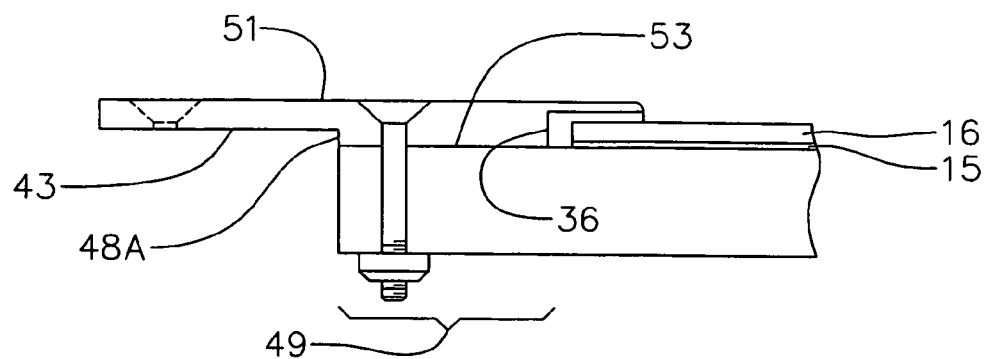
FIG. 3A is a cross-sectional view of another exemplary embodiment window assembly of the present invention.
Figure 3B:
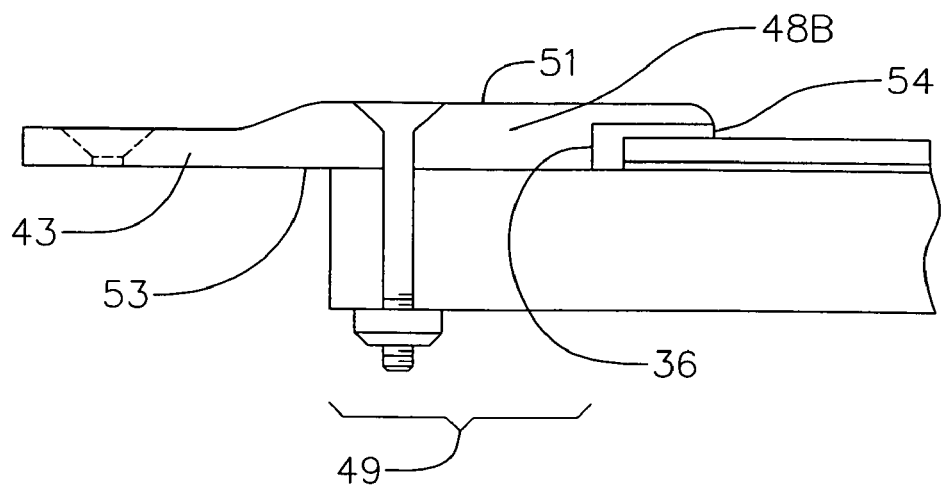
FIG. 3B is a cross-sectional view of a further exemplary embodiment window assembly of the present invention.
Figure 4:
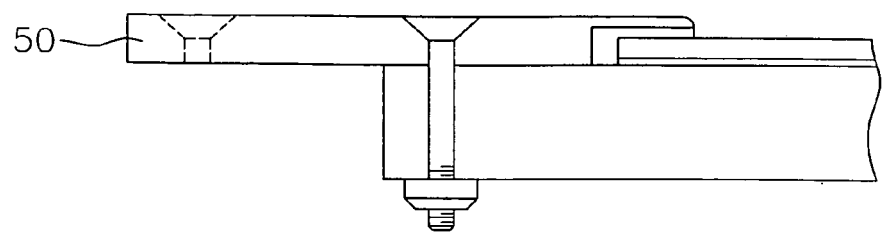
FIG. 4 is a cross-sectional view of yet another exemplary embodiment window assembly of the present invention.

In a further alternate embodiment, instead of using a spacer, a thicker frame may be used. The frame 43 may just have a thicker portion 48A or 48B for interfacing with the main ply end portion 49 extending beyond the first end 36 of the frame as shown in FIGS. 3A and 3B, respectively, or the entire frame 50 may be thicker as for example shown in FIG. 4. As can be seen from FIGS. 3A and 3B, the thicker portion 48A or 48B of the frame may be formed by stepping outward the outer surface 53 of the frame as for example shown in FIG. 3B, or by stepping inward the inner surface 51 of the frame as shown for example in FIG. 3A.

Figure 5:
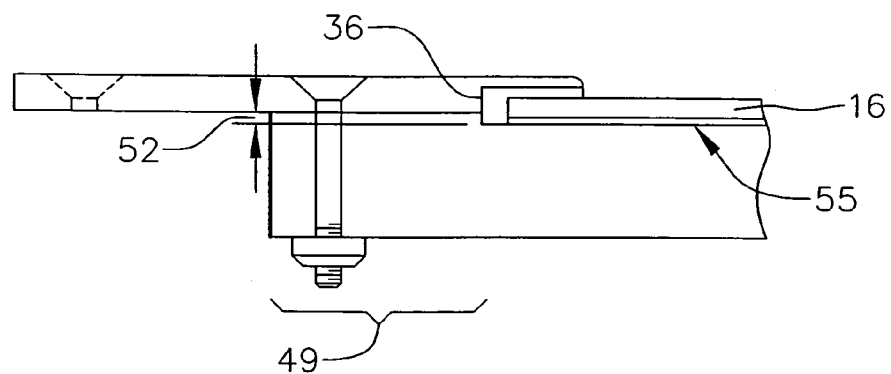
FIG. 5 is a cross-sectional view of another exemplary embodiment window assembly of the present invention.

In yet a further alternate embodiment, instead of a spacer, the main ply end portion 49 extending beyond the first end 36 of the frame may be made thicker by including an additional portion 52, as for example shown in FIG. 5. With this embodiment, the frame may be formed by machining out a portion of the thicker frame defining a well 55 for accommodating the face ply 16.

In another exemplary embodiment, the thickness of the spacer, if used, and the thickness of the frame overhang portion and main ply may be varied as necessary for obtaining a proper space between the overhang portion and the face ply for accommodating the seal. For example, the spacer may be made thinner thus requiring that the frame be thicker.

In an alternate exemplary embodiment, including any of the aforementioned exemplary embodiments, the seal with overhang portion or hump portion 48 is preformed and fitted into the gap such the hump portion extends over the face ply. The main ply is then mounted on the frame, sandwiching the spacer, if used, between the main ply and the frame, and the seal itself is compressed between the frame overhang portion and the face ply. Again with these embodiments, excess seal material extending beyond the face ply due to the compression, may be easily removed ensuring that the seal hump is at a desired length. Consequently, with either of these embodiments, the cost of manufacturing or forming the seal is reduced since one does not have to pre-form the seal hump to an exact length and/or thickness.

Figure 7:
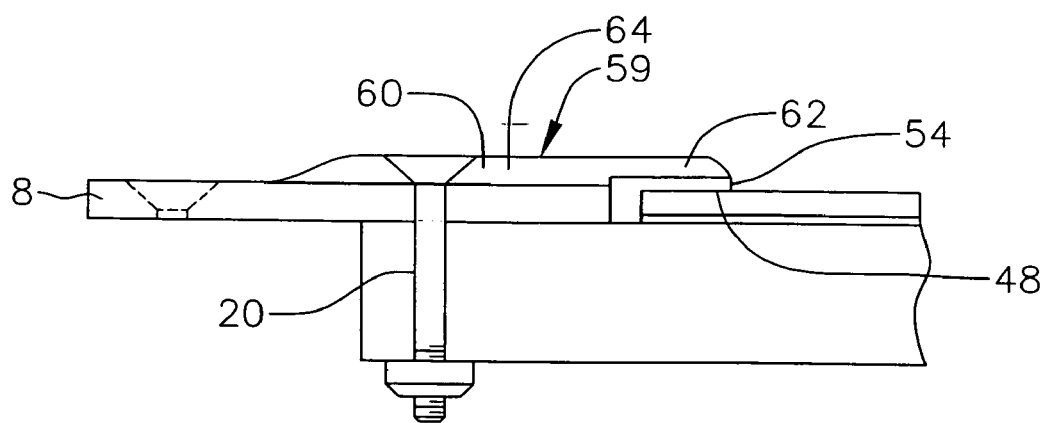
FIG. 7 is a cross-sectional view of another exemplary embodiment window assembly of the present invention.

In yet a further exemplary embodiment, the frame may be formed without an overhang portion. With this embodiment, a separate supporting member 59 having a main body portion 60 and an overhang portion 62 may be coupled or otherwise attached to the frame. The overhang portion 62 may have a thinner thickness than an immediate adjacent portion 64 of the supporting member to accommodate the hump portion 48 of the seal as for example shown in FIG. 7. In alternate exemplary embodiments, the frame may be made thicker and/or a spacer may be incorporated between the frame and the main ply such that the thickness of the supporting member overhang portion 62 does not have to be less than its adjacent portion 64 for providing sufficient space between the face ply and the supporting member overhang portion for accommodating the seal hump portion. In the exemplary embodiment shown in FIG. 7, the supporting member is fastened to the frame with fasteners 20. The supporting member may be a plate or other structure that spans the entire frame or portions of the frame.

With any of the aforementioned exemplary embodiments, the frame or supporting member overhang portion provides a force such as a clamping force for preventing the prying action of the face ply when the main ply is deflected outward toward the face ply due to aircraft pressurization and thus, preventing the delamination of the end of face ply from the interlayer and/or the delamination of the end of the face ply and interlayer from the main ply. Moreover, the frame or supporting member overhang portion prevents the seal from lifting. With any such exemplary embodiment, the thickness of the overhang portion should be chosen so that the overhang portion stiffness is sufficient for preventing the deflection and thus the delamination of the face ply from the interlayer or the delamination of the face ply and interlayer from the main ply.

With all of these embodiments, the frame overhang portion 30 or the supporting member overhang portion 62 protects the seal from exposure to the outer environment. Only an edge 54 of the seal is exposed to the outer environment. In this regard, seal erosion and cracking is minimized.

Figure 6:
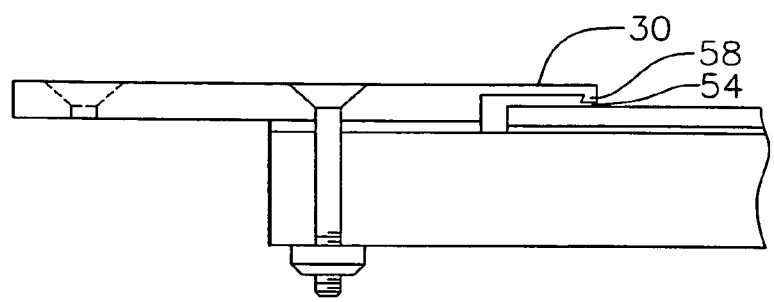
FIG. 6 is a cross-sectional view of a further exemplary embodiment window assembly of the present invention.

In yet another exemplary embodiment, the frame overhang portion 30 or the supporting member overhang portion includes a lip portion 58 extending from the end of the frame overhang portion and in a direction toward the face ply as for example shown in relation to the frame in FIG. 6. In this regard, a smaller portion of the edge 54 of the seal 45 is exposed to the outer environment, thus further protecting the seal from the consequences of such exposure.

With any of the aforementioned exemplary embodiments, the frame or supporting member overhang portion may not have to span the entire perimeter of a window. Rather, the overhang portion may be selectively used in areas that are most prone to face ply prying action and delamination, and/or most susceptible to seal erosion.

Although specific exemplary embodiments are disclosed herein, it is expected that persons skilled in the art can and will design or derive alternative window assemblies and/or methods of forming window assemblies that are within the scope of the following claims either literally or under the doctrine of equivalents.

The invention claimed is:

1. A window assembly comprising:
   a window frame;
   a window transparency first ply coupled to the frame and extending beyond the frame;
   a window transparency second ply coupled to the first ply, the second ply having an outer surface opposite an inner surface and extending beyond the frame and being spaced apart from the frame defining a gap over the first ply between the frame and the second ply, wherein a portion of the frame extends over the gap and the second ply outer surface; and
   a seal within the gap and between the second ply and the portion of the frame extending over the second ply outer surface.

2. An assembly as recited in claim 1 wherein the first ply is fastened to the frame.

3. An assembly as recited in claim 1 further comprising a spacer sandwiched between the frame and the first ply.

4. An assembly as recited in claim 1 wherein a thickness of the frame portion extending over the second ply is less than a thickness of a portion of the frame not extending over the second ply.

5. An assembly as recited in claim 1 wherein the portion of the frame extending over the second ply outer surface extends over the gap and wherein said portion of the framehas a thickness that is less than a thickness of a portion of the frame not extending over the second ply and gap.

6. An assembly as recited in claim 1 wherein the portion of the frame extending over the second ply outer surface has sufficient stiffness for preventing a portion of the second ply, over which extends said portion of the frame, from delaminating from the first ply.

7. An assembly as recited in claim 1 wherein the portion of the frame extending over the second ply provides a clamping force on the second ply.

8. A window assembly comprising:
   a window first structure;
   a window transparency first ply coupled to the first structure;
   a window transparency second ply having an outer surface opposite an inner surface and coupled to the first ply and spaced apart from the first structure wherein a gap is defined over the first ply between the second ply and the first structure;
   a window second structure coupled to the first structure, wherein a portion of the second structure extends beyond the first structure and over the gap and the second ply outer surface; and
   a seal within the gap and between the second ply and the portion of the second structure extending over the second ply outer surface.

9. An assembly as recited in claim 8 wherein the window first structure, the window second structure and the first ply are fastened together.

10. An assembly as recited in claim 8 wherein the portion of the window second structure extending over the second ply outer surface and gap has a thickness that is less than a portion of the window second structure not extending over the second ply and gap.

11. An assembly as recited in claim 8 wherein the first structure is a window frame and wherein the second structure is a supporting member.

12. An assembly as recited in claim 8 wherein the second structure is a window frame and wherein the first structure is a spacer.

13. An assembly as recited in claim 8 wherein the portion of the window second structure extending over the second ply outer surface has sufficient stiffness for preventing a portion of the second ply, over which extends said portion of the second structure, from delaminating from the first ply.

14. An assembly as recited in claim 8 wherein the portion of the second structure extending over the second ply provides a clamping force on the second ply.

15. A method of forming a window assembly comprising:
   providing a window frame;
   coupling a window transparency first ply to the frame, wherein a portion of the first ply extends beyond the frame;
   coupling a window transparency second ply having an outer surface opposite an inner surface to the first ply at a location spaced apart from the frame wherein a gap is defined over the first ply between the second ply and the frame, and wherein a portion of the frame extends over the gap and over the second ply outer surface; and
   providing a seal within the gap and between the second ply and the portion of the frame extending over the second ply outer surface.

16. A method as recited in claim 15 wherein coupling a window transparency first ply to the frame comprises compressing the seal between the frame, the first ply and the second ply, the method further comprising removing a portion of the seal extending beyond the frame.

17. A method as recited in claim 15 wherein providing a seal comprises applying a sealing material to the gap and between the frame and the second ply, wherein the sealing material is selected from group of sealing materials consisting of silicones, polyurethanes, polysulfides, or other elastomeric materials.

18. A method as recited in claim 15 further comprising removing a portion of the sealing material extending beyond the frame.

19. A method as recited in claim 15 further comprising selecting a thickness of the frame portion extending over the second ply outer surface to be sufficient for preventing a portion of the second ply, over which extends the portion of the frame, from delaminating from the first ply.

20. A method as recited in claim 15 further comprising providing a clamping force on the second ply with the portion of the frame extending over the second ply.

21. A method recited in claim 20 wherein the clamping force provided is in reaction to an outward pressurization deflection of the first ply.

22. A method as recited in claim 15 wherein coupling a window transparency first ply to the frame comprises fastening the window transparency first ply to the frame.

23. A method of forming a window assembly comprising:
   providing a window first structure;
   coupling a window transparency first ply to the first structure;

coupling a window transparency second ply having an outer surface opposite an inner surface to the first ply at a location spaced apart from the first structure wherein a gap is defined over the first ply between the second ply and the first structure;

coupling a window second structure to the first structure, wherein a portion of the second structure extends beyond the first structure and over the gap and the second ply outer surface; and providing a seal within the gap and between the second ply and the portion of the second structure extending over the second ply outer surface.

24. A method as recited in claim 23 wherein the first structure is a window frame and wherein the second structure is a supporting member.

25. A method as recite in claim 23 wherein the second structure is a window frame and wherein the first structure is a spacer.

26. A method as recited in claim 23 further comprising removing a portion of the seal extending beyond the portion of the second structure extending over the second ply.

27. A method as recited in claim 23 further comprising selecting a thickness of the second structure portion extending over the second ply outer surface to be sufficient for preventing a portion of the second ply, over which extends the portion of the second structure, from delaminating from the first ply.

28. A method as recited in claim 23 further comprising providing a clamping force on the second ply with the portion of the second structure extending over the second ply.

29. A method recited in claim 28 wherein the clamping force is provided in reaction to an outward pressurization deflection of the first ply.

30. A method as recited in claim 23 wherein coupling a window transparency first ply to the first structure comprises fastening the window transparency first ply to the first structure.

* * * * *